(12) United States Patent
Maki et al.

(10) Patent No.: US 6,434,216 B1
(45) Date of Patent: Aug. 13, 2002

(54) SOURCE PIN LOADER METHOD AND APPARATUS FOR POSITRON EMISSION TOMOGRAPHY

(75) Inventors: Michael D. Maki, Oconomowoc; Thomas R. Schaefer, Germantown; Larry Susami, Waukesha, all of WI (US)

(73) Assignee: GE Medical Systems Global Technology Company, LLC, Waukesha, WI (US)

(*) Notice: Subject to any disclaimer, the term of this patent is extended or adjusted under 35 U.S.C. 154(b) by 0 days.

(21) Appl. No.: 09/681,326

(22) Filed: Mar. 16, 2001

(51) Int. Cl.[7] ............................................. G01T 1/166
(52) U.S. Cl. .................. 378/9; 250/363.04; 250/363.03
(58) Field of Search ................ 378/9, 207; 250/363.03, 250/363.04, 370.09

(56) References Cited

U.S. PATENT DOCUMENTS

| | | |
|---|---|---|
| 4,235,454 A | 11/1980 | Gray et al. |
| 4,501,011 A | 2/1985 | Hauck et al. |
| 4,791,934 A | 12/1988 | Brunnett |
| 5,594,638 A | 1/1997 | Iliff |
| 5,711,297 A | 1/1998 | Iliff |
| 5,724,968 A | 3/1998 | Iliff |
| 5,821,541 A | 10/1998 | Tümer |
| 5,834,780 A * | 11/1998 | Morgan et al. ........ 250/363.04 |
| 5,868,669 A | 2/1999 | Iliff |
| 5,910,107 A | 6/1999 | Iliff |
| 6,022,315 A | 2/2000 | Iliff |
| 6,113,540 A | 9/2000 | Iliff |
| 6,160,263 A * | 12/2000 | Smith et al. ............. 250/493.1 |
| 6,201,247 B1 * | 3/2001 | Lutheran et al. ....... 250/363.04 |
| 6,206,829 B1 | 3/2001 | Iliff |

* cited by examiner

Primary Examiner—Drew A. Dunn
(74) Attorney, Agent, or Firm—Carl B. Horton, Esq.; Armstrong Teasdale LLP

(57) ABSTRACT

In the exemplary embodiment, a method is provided for transporting a source pin in a Positron Emission Tomography (PET) system. The PET system includes a storage device, a transmission ring, and a source pin loader. The method includes aligning the transmission ring and the source pin, linearly moving the source pin to the transmission ring, and operatively engaging the source pin in the transmission ring.

26 Claims, 3 Drawing Sheets

SOURCE PIN LOADER METHOD AND APPARATUS FOR POSITRON EMISSION
TOMOGRAPHY

BACKGROUND OF INVENTION

This invention relates generally to Positron Emission Tomography (PET) systems, and more particularly, to methods and apparatus for loading and storing radioactive source pins used in PET.

Radioactive source pins are used to calibrate PET detector systems. Source pins are also used to provide attenuation during system use or imaging. Because the pins are radioactive, they are stored in a shielded storage device when not in use. The storage device is structurally secure and shields the environment from radiation exposure from the radioactive source pin. The storage device is generally within the PET system. During use the source pin or pins are withdrawn from storage and placed in a rotatable transmission ring within a bore of the PET detector system.

After use, the pin or pins are returned to the storage device. Source pin transport time is a time period between initial removal of the source pin from the storage device to placement in the transmission ring. It is desirable to minimize source pin transport time to reduce potential non-beneficial radiation exposure. Because the shielding requirements limit the placement of the storage device automatic source pin handling is often complex and unreliable. It is therefore desirable to provide a source pin loader that facilitates quick and reliable handling of the source pin including unloading the source pin from the storage device, transporting the pin and installation of the source pin within the transmission ring.

SUMMARY OF INVENTION

In the exemplary embodiment, a method is provided for transporting a source pin in a Positron Emission Tomography (PET) system. The PET system includes a storage device, a transmission ring, and a source pin loader. The method includes aligning the transmission ring and the source pin, linearly moving the source pin to the transmission ring, and operatively engaging the source pin in the transmission ring.

DETAILED DESCRIPTION

Figure 1:
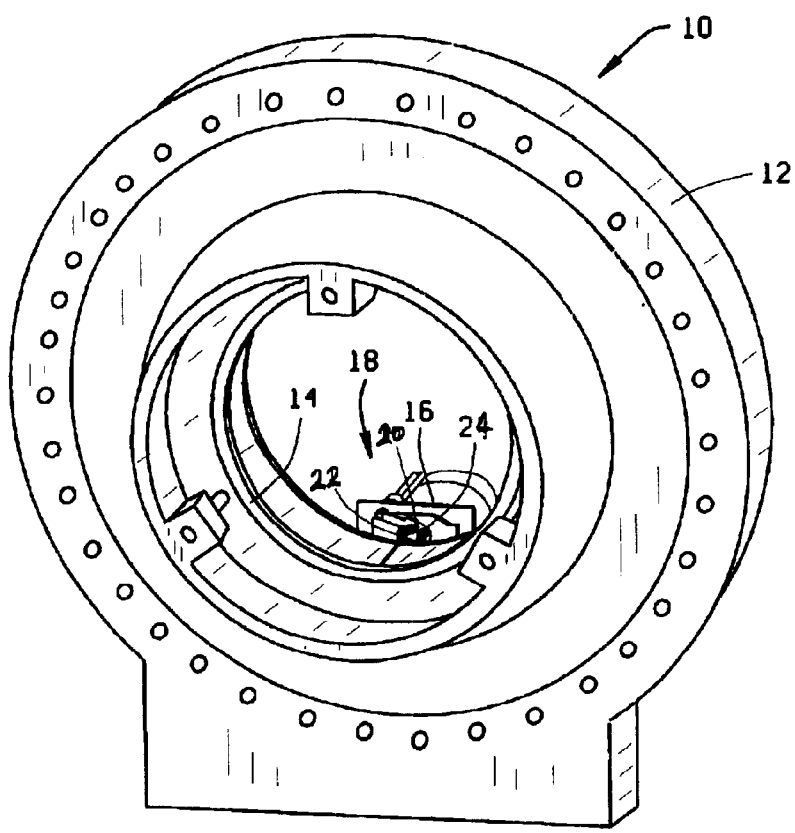
FIG. 1 is a pictorial view of an embodiment of a PET system.

Referring to FIG. 1, a Positron Emission Tomography (PET) system 10 is shown including a gantry 12, a rotatable transmission ring 14, a storage device 16, and a source loader 18. Storage device 16 stores one or more radioactive source pins. In the exemplary embodiment, three source pins 20, 22, and 24 are stored in storage device 16. One radioactive source pin 20, 22 or 24 is removed from storage device 16 and installed in transmission ring 14 to calibrate PET system 10. In one embodiment, source pin 20, 22, or 24 is also removed from storage device 16 and installed in transmission ring 14 to provide attenuation measurements during patient scanning.

Figure 2:
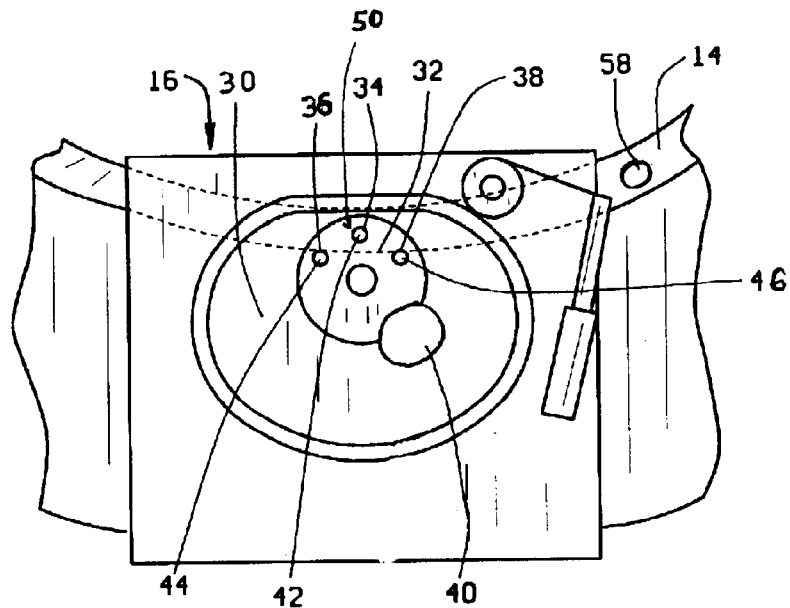
FIG. 2 is a partial rear view of the PET system of FIG. 1 including an embodiment of a storage device.

FIG. 2 is a partial rear view of PET system 10 including storage device 16. Storage device 16 includes primary shielding 30, a rotatable shielding cylinder 32, storage cavities 34, 36, and 38, and a rotating mechanism 40. Primary shielding 30 provides sufficient attenuation of radioactive source pins 20 to protect the environment near the PET system 10, including personnel. Rotatable shielding cylinder 32 is within primary shielding 30 and is selectively rotated or indexed. Storage cavities 34, 36, and 38 have cylindrical cross-sectional profiles that are substantially concentric with respect to respective axes 42, 44, and 46. Each storage cavity 34, 36, or 38 is sized to contain a portion of one source pin 20, 22 or 24. In the exemplary embodiment, rotatable shielding cylinder 32 is indexed by rotating mechanism 40 to four positions, including a storage position (not illustrated), and an access position 50 for each storage cavity 34, 36, and 38. When rotatable shielding cylinder 32 is indexed to the storage position, rotatable shielding cylinder 32 is positioned such that storage cavities 34, 36, and 38 are substantially centered within primary shielding 30. FIG. 2 illustrates storage cavity 34 in access position 50 such that axis 42 is aligned substantially perpendicular to transmission ring 14 and co-axially with one of a plurality of receiver openings 58 in transmission ring 14. In an embodiment, receiver openings 58 include magnetic material to secure source pins 20, 22 or 24. Transmission ring 14 is also indexed to ensure receiver openings 58 are aligned to access position 50. Control of rotating mechanism 40, transmission ring 14 rotation, and operation of PET systems 10 are governed by a remote control mechanism (not shown) as is known in the art.

Figure 3:
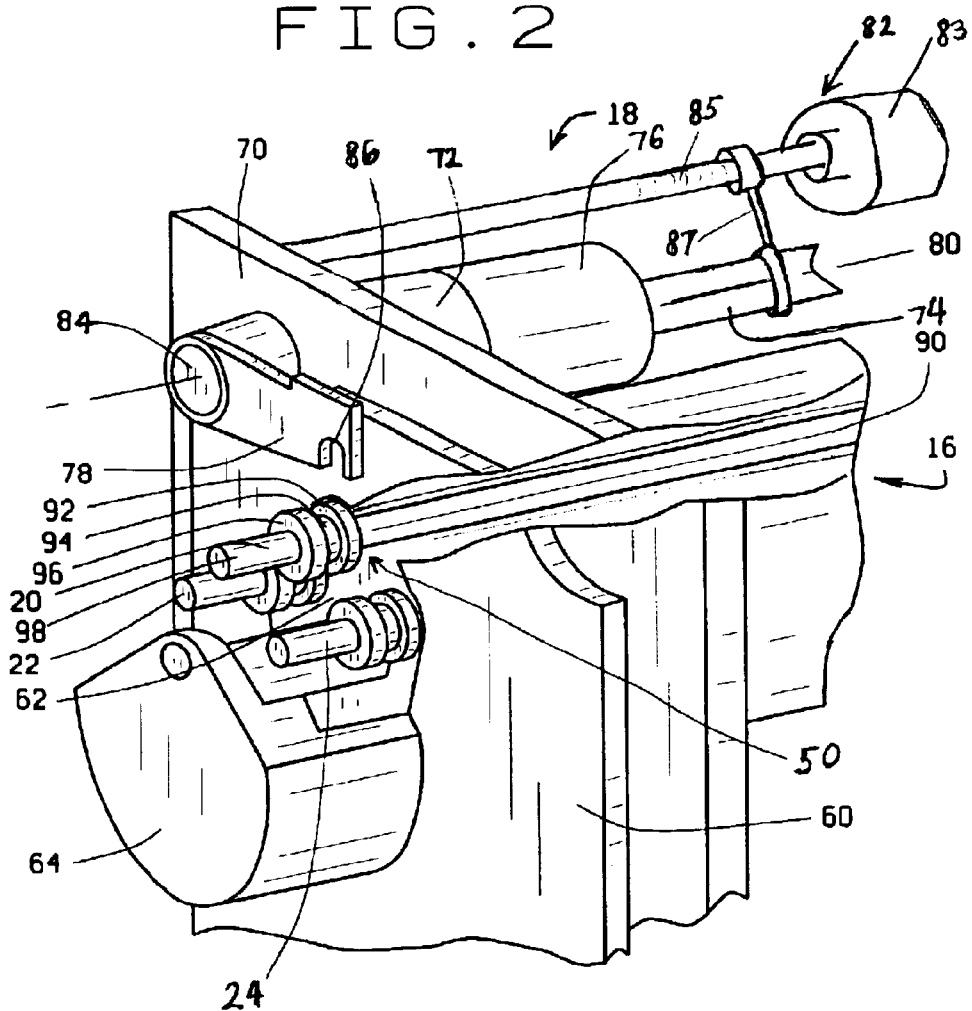
FIG. 3 is an enlarged, front perspective view of the storage device of FIG. 2, including a source loader and source pins, the source loader being disengaged from the source pins.

FIG. 3 shows an enlarged, front perspective view of storage device 16 and source loader 18. Storage device 18 further includes shielding plate 60, canning plate 62, and shielding cap 64. In the exemplary embodiment, canning plate 62, while providing some shielding effect, includes a magnetic material that provides strength, durability, and corrosion resistance, such as stainless steel. In one embodiment, canning plate 62 is fabricated from magnetic material. Shielding cap 64 provides axial shielding from radioactive source pins 20, 22, 24 and assists in retaining source pins 20, 22, 24 when rotatable shielding cylinder 32 is in the storage position.

Source loader 18 includes a mounting plate 70, a support housing 72, an operating rod 74, a transfer assembly 76, a latch arm 78, an axis 80 and a linear drive 82. Mounting plate 70 is attached to storage device 16 and provides a fixed, spatial relationship between storage device 16 and source loader 18. Support housing 72 is attached to mounting plate 70 and provides support for transfer assembly 76 and operating rod 74. Operating rod 74 is a cylindrical rod that includes axis 80. Axis 80 is oriented substantially parallel to storage cavity axis 42. Operating rod 74 extends through mounting plate 70, support housing 72, and transfer assembly 76. Operating rod 74 includes a proximate end 84 that is adjacent mounting plate 70. The operator remotely operates transfer assembly 76 to rotate operating rod 74. Transfer assembly 76 selectively rotates operating rod 74 partially about axis 80. In the exemplary embodiment, linear drive 82 includes a linear drive motor 83, a drive screw 85 and a coupling 87. Linear drive 82 linearly repositions operating rod 74 along axis 80, so that operating rod 74 proximate end 84 is moved from adjacent mounting plate 70 to adjacent transmission ring 14, or from adjacent transmission ring 14 to adjacent mounting plate 70. In another embodiment (not shown), operating rod 74 is linearly repositioned directly by drive motor 83. In yet another embodiment (not shown), transfer assembly 76 includes drive motor 83 and transfer assembly 76 linearly repositions operating rod 74.

Latch arm 78 is attached to proximate end 84 and includes an engaging portion 86. Latch arm 78 is sized so that engaging portion 86 engages source pin 20 when source pin 20 is in access position 50.

Source pin 20 includes a radioactive section 90, a first collar 92, an engagement section 94, a second collar 96 and an alignment section 98. In the exemplary embodiment, first collar 92, engagement section 94, second collar 96 and alignment section 98 include non-radioactive, magnetic material. In one embodiment, first collar 92, engagement section 94, second collar 96 and alignment section 98 are fabricated from magnetic material. In another embodiment, alignment section 98 is an extension of radioactive portion 90, and first collar 92, engagement section 94, and second collar 96 are securely attached around radioactive portion 90. The magnetic attraction between first collar 92 and canning plate 62 holds source pin 20 within storage device 16.

Figure 4:
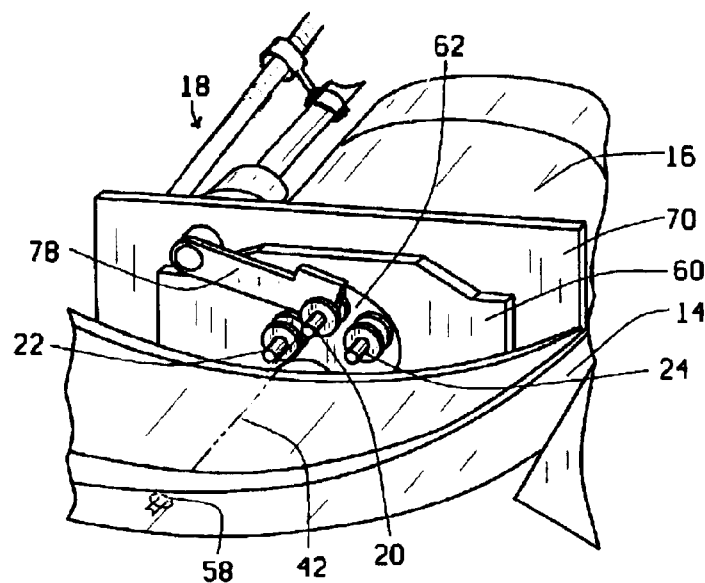
FIG. 4 is a perspective front view of a portion of the PET system embodiment of FIG. 1, including the source loader, the storage device, and a transmission ring.

FIG. 4 is a perspective front view of a portion of PET system 10 including source loader 18, storage device 16, and transmission ring 14. During operation, an operator remotely controls PET system 10. As shown in FIG. 4, transfer assembly 76 rotates operating rod 74 such that latch arm 78 engages source pin 20. Engagement portion 86 of latch arm 78 rotates into engagement section 94 of source pin 20 and is frictionally engaged with first collar 92 and second collar 96. In another embodiment, engagement portion 86 magnetically and frictionally engages first collar 92 and second collar 96. Transmission ring 14 rotationally indexes and axially aligns to position a selected receiver opening 58 in line with source pin axis 42, in access position 50.

Figure 5:
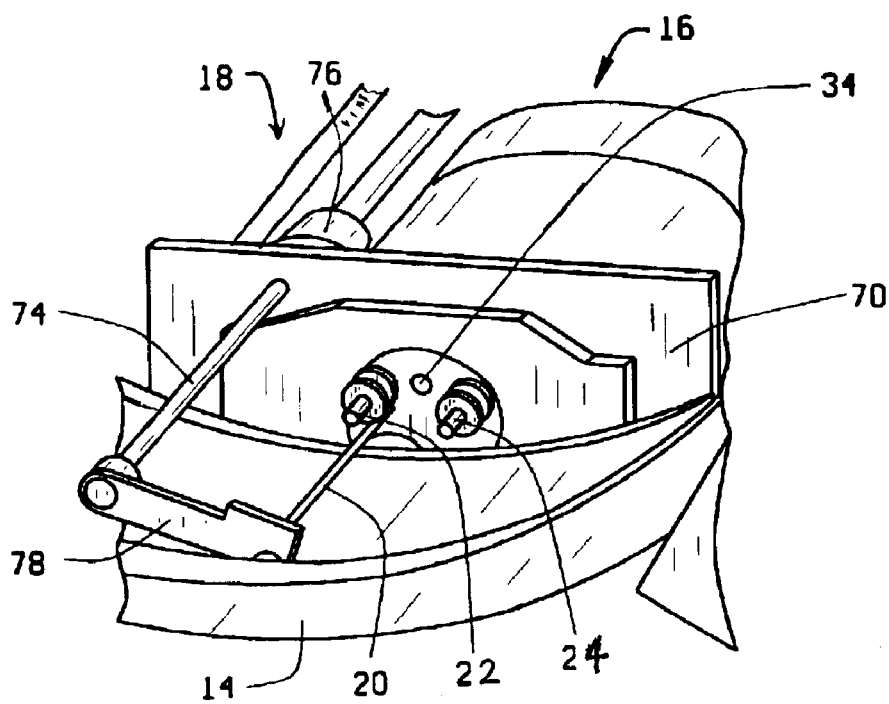
FIG. 5 is a perspective front view of a portion of the PET system embodiment of FIG. 1 including the source loader and the storage device of FIGS. 2 and 3, with the source pin in the transmission ring.
Figure 6:
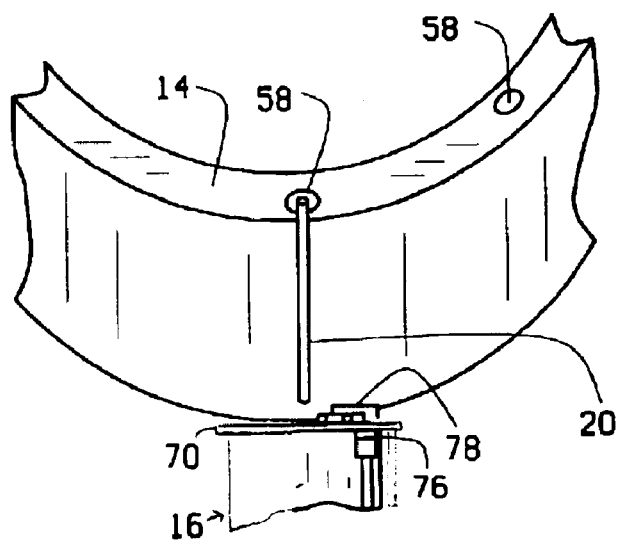
FIG. 6 is a rear perspective view of the transmission ring of FIG. 5 with the source pin installed.

FIG. 5 is a perspective front view of a portion of PET system 10 including source loader 18, storage device 16 with source pin 20 in transmission ring 14. FIG. 6 is a rear perspective view of transmission ring 14 of FIG. 5 with source pin 20 installed. Source rod 20 is magnetically and frictionally engaged by engagement portion 86. Linear drive 82 extends operating rod 74 so that latch arm 78 moves linearly from adjacent mounting plate 70 to adjacent transmission ring 14. Source rod 20 is withdrawn from storage cavity 34 by the movement of latch arm 78. In one embodiment, source rod 20 is moved in a single linear, axial direction. Alignment section 98 of source pin 20 is positioned within transmission ring receiver opening 58 so that second collar 96 magnetically secures source pin 20 to transmission ring 14.

Transfer assembly 76 rotates operating rod 74 to disengage latch arm engagement portion 86 from source pin engagement section 94. Transfer assembly 76 also retracts operating rod 74, thus positioning latch arm 78 adjacent mounting plate 70.

Rotatable shielding cylinder 32 is selectively rotatable to position a second source pin 22 in access position 50. When an operator selects rotation to this position, transmission ring 14 rotates to align a second receiver opening 58 in position to receive source pin 22. Source loader 18 repeats this process to engage source pin 22, extend operating rod 74, insert source pin 22 in receiver opening 58, rotate operating rod 74 to disengage source pin 22, and retract operating rod 74. The process is repeatable to install source pin 24 within transmission ring 14 in a similar fashion.

In one embodiment, rotatable shielding cylinder 32 is rotated to the storage position to provide increased shielding of any source rods remaining in the storage device during PET system calibration or patient scanning. In another embodiment, rotatable shielding cylinder 32 is maintained in access position 50 during PET system calibration or patient scanning.

When the operator desires to store source pin 20, transmission ring 14 rotates to a indexed position to align receiver opening 58 containing source pin 20 with storage device 18. Rotatable shielding cylinder 32 rotates to align storage cavity 34 in access position 50, so that axis 42 is aligned substantially perpendicular to transmission ring 14 and co-axially with respect to respective receiver opening 58. Linear drive 82 extends operating rod 74, positioning latching arm 78 adjacent transmission ring 14. Transfer assembly 76 rotates operating rod 74, frictionally engaging source rod 20 in engagement section 94, between first collar 92 and second collar 96 with engagement portion 86. Linear drive 82 retracts operating rod 74, removing alignment section 98 from receiver opening 58, and magnetically disengaging second collar 96 from transmission ring 14. As operating rod 74 retracts, source pin 20 remains aligned with storage cavity 34 and axis 42. Radioactive section 90 enters storage cavity 34. First collar 92 magnetically engages canning plate 62 and secures source pin 20 in storage device 16 when operating rod 74 moves adjacent mounting plate 70. Transfer assembly 76 rotates operating rod 74 to disengage latch arm 78 and engagement portion 86 from source pin 20. Other source pins 22, 24 are returned to storage device 16 in a similar fashion.

PET system embodiments of the present invention are cost-effective and highly reliable. A storage device includes a rotatable shielding cylinder that rotates a selected storage cavity to an access position that is aligned with a receiver opening in a transmission ring. A source loader linearly transports a source pin and installs the source pin in the transmission ring. Similarly, the source pin is removed from the transmission ring and returned to the storage cavity. The rotatable shielding cylinder then rotates to a storage position. As a result, embodiments of the present invention facilitate quick and reliable handling of radioactive source pins.

While the invention has been described in terms of various specific embodiments, those skilled in the art will recognize that the invention can be practiced with modification within the spirit and scope of the claims.

What is claimed is:

1. A method for transporting a source pin in a Positron Emission Tomography (PET) system having a transmission ring, said method comprising:
   aligning the transmission ring with a source pin within a storage device;
   linearly moving the source pin from the storage device to the transmission ring; and
   operatively engaging the source pin to the transmission ring.

2. A method in accordance with claim 1 wherein said step of aligning the transmission ring further comprises the step of aligning the storage device to an access position.

3. A method in accordance with claim 2 wherein said step of aligning the storage device to an access position comprises the step of axially aligning the source pin in a storage cavity in the storage device to the transmission ring.

4. A method in accordance with claim 3 wherein said step of axially aligning the source pin comprises the step of rotating the source pin from a storage position to an access position.

5. A method in accordance with claim 1 wherein said step of operatively engaging the source pin to the transmission ring further comprises the step of magnetically engaging the source pin to the transmission ring.

6. A method in accordance with claim 1 wherein said step of linearly moving the source pin from the storage device to the transmission ring further comprises the step of linearly moving the source pin along an axis from the storage device to the transmission ring.

7. A method in accordance with claim 1 wherein said step of linearly moving the source pin from the storage device to the transmission ring further comprises the step of engaging the source pin with a latch arm and linearly moving the latch arm along an axis from the storage device to the transmission ring.

8. A method in accordance with claim 1 wherein said method further comprising the steps of:
    aligning a second source pin to an access position;
    aligning the transmission ring to a second source pin within the storage device;
    linearly moving the second source pin from the storage device to the transmission ring; and
    operatively engaging the second source pin in the transmission ring.

9. A method in accordance with claim 1 wherein said method further comprising the steps of:
    aligning the storage device to an access position;
    aligning the source pin in the transmission ring to the storage device;
    linearly disengaging the source pin from the transmission ring;
    linearly moving the source pin to the storage device;
    installing the source pin in the storage device.

10. A method in accordance with claim 9 wherein said step of installing the source pin in the storage device further comprises the step of rotating the source pin to a storage position.

11. A method for transporting a source pin in a Positron Emission Tomography (PET) system, the system including a source loader, a storage device including at least one storage cavity, and a transmission ring including at least one receiver opening, said method comprising the steps of:
    loading the source pin in the transmission ring from the storage device comprising the following steps of:
    aligning the storage cavity containing the source pin in an access position;
    aligning the transmission ring, including the receiver opening, to receive the source pin;
    engaging the source pin with the source loader;
    linearly moving the source pin from the storage cavity to the transmission ring;
    operatively engaging the source pin in the source receiver;
    disengaging the source pin from the source loader;
    returning the source pin to the storage device comprising the steps of:
    aligning the source cavity in an access position;
    aligning the receiver opening containing the source pin to the storage cavity;
    engaging the source pin with the source loader;
    linearly moving the source pin from the receiver opening to the storage device;
    installing the source pin in the storage cavity;
    disengaging the source loader from the source pin; and
    positioning the storage device in a storage condition.

12. A method in accordance with claim 11 wherein said step of loading the source pin further comprising the following steps of:
    aligning a second source pin to an access position;
    aligning the transmission ring to receive a second source pin;
    engaging the second source pin with the source pin loader;
    linearly moving the second source pin to the transmission ring;
    operatively engaging the second source pin with a second receiver opening in the transmission ring; and
    disengaging the source pin loader from the second source pin.

13. A Positron Emission Tomography (PET) system comprising:
    a rotatable transmission ring;
    a storage device adjacent said transmission ring;
    at least one source pin storable in said storage device; and
    a pin loader adjacent said storage device, said pin loader configured to engage said source pin and linearly move said source pin between said storage device and said transmission ring.

14. A PET system in accordance with claim 13 wherein each said source pin includes at least one radioactive section and at least one non-radioactive section.

15. A PET system in accordance with claim 13 wherein each said source pin includes a first collar and a second collar, both said collars configured to be engaged by said pin loader.

16. A PET system in accordance with claim 15 wherein both said first collar and said second collar are magnetic.

17. A PET system in accordance with claim 16 wherein each said source pin collar is non-radioactive.

18. A PET system in accordance with claim 13 wherein each said source pin includes an alignment section.

19. A PET system in accordance with claim 18 wherein said alignment section is non-radioactive.

20. A PET system in accordance with claim 18 wherein said transmission ring comprises at least one receiver opening configured to receive at least a portion of said alignment section.

21. A PET system in accordance with claim 13 wherein said storage device comprises:
    a radiation shield;
    a rotatable storage cylinder within said radiation shield;
    at least one storage cavity within said storage cylinder; and
    a rotation device configured to rotate said storage cylinder so as to selectably position each said storage cavity in an access position.

22. A PET system in accordance with claim 21 wherein said storage device further comprises a rotation device configured to rotate said storage cylinder so as to selectably position each storage cavity in a storage position.

23. A PET system in accordance with claim 13 wherein said transmission ring comprises at least one receiver opening configured to receive said source pin.

24. A PET system in accordance with claim 23 wherein said receiver opening is magnetic.

25. A PET system in accordance with claim 13 wherein said pin loader comprises a latching device configured to selectably engage at least a portion of said source pin, said source pin in said access position.

26. A PET system in accordance with claim 13 wherein said source pin comprises an axis of symmetry, said pin loader configured to engage said source pin and transport said source pin in a substantially axial movement between said storage device and said transmission ring.

* * * * *